UNITED STATES PATENT OFFICE.

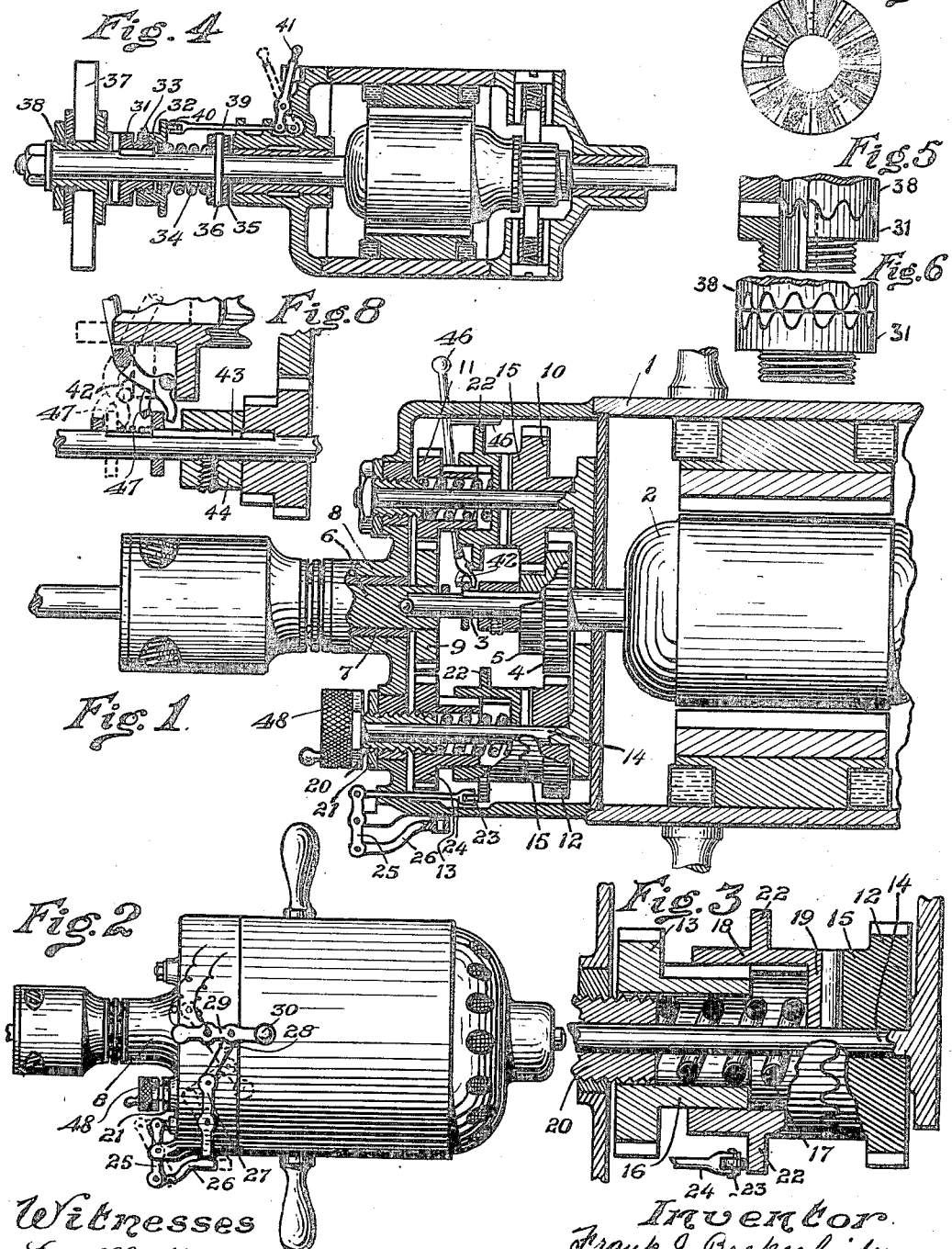

FRANK J. BACKSCHEIDER, OF CINCINNATI, OHIO.

AUTOMATIC POWER CUT-OFF.

1,229,570.   Specification of Letters Patent.   Patented June 12, 1917.

Application filed August 31, 1912. Serial No. 718,100.

*To all whom it may concern:*

Be it known that I, FRANK J. BACKSCHEIDER, a citizen of the United States, residing in Cincinnati, in the county of Hamilton and State of Ohio, have invented a certain new and useful Improvement in Automatic Power Cut-Offs, of which the following is a full, clear, and exact description, reference being had to the accompanying drawings, forming part of this specification.

My invention relates to a new form of clutch to be used especially in connection with machine tools, but which may also be used on other power driven devices, where it is desired, when the tool or machine is subjected to an overload, automatically to cause the motor to run free of the stalled device; the clutch, on overloading, moreover, being adapted, where desirable, automatically to disconnect the motor from the source of power supply or to break any link in the transmission, whereby the stalled device is disconnected from the power, thus relieving the motor.

In power driven tools and other devices, the motor, when the tool or other device becomes stalled, is subjected to an overload and is, in consequence, damaged, unless some intermediate means is provided to take care of such overload. This is usually done, in electrically driven devices, by a fuse, which fuse is burnt out by the overload, thus relieving the motor. The practice of using such fuses, however, results in considerable inconvenience in the matter of replacing burnt out fuses, and it is to relieve the motor from such overloading, without the use of fuses, in the case of electrical devices, that my new clutch is designed, automatically and instantaneously, when the device becomes stalled, to control the power, disconnecting the same either before the motor, or between the motor and the stalled device, thus saving the motor from injury.

The objects of my invention are to provide a clutch by the use of which the purposes above outlined will be efficiently and inexpensively subserved.

In the drawings I have shown my new clutch as applied to tools for grinding and drilling purposes, but it will be understood that the same may be applied to any other power driven tool or device of like or similar operative principle, and therefore I do not limit myself to the applications as herein set forth.

In the drawings:

Figure 1 is a longitudinal section of part of a portable electric drill;

Fig. 2 is an elevation of the same;

Fig. 3 is an enlarged section of my new clutch as applied to said drill to disconnect the motor from the dynamo;

Fig. 4 is a longitudinal section showing my clutch applied to a grinder;

Fig. 5 is a detail of the clutch, partly in section;

Fig. 6 is an elevation of said clutch;

Fig. 7 is a view of the face of one member of the clutch;

Fig. 8 is an enlarged section of my clutch as applied to the drill in Fig. 1 and adapted to break the transmission.

The numeral 1 indicates the casing of a portable electric drill, which may be of any ordinary type. In said casing the armature 2 is mounted in the usual manner, and has a shaft 3 which carries spur gears 4 and 5, adapted, in connection with the gears with which they intermesh, to transmit movement at different speeds to the drill in the usual manner. The end of said armature shaft 3 is journaled into the upper end of the drill spindle 6 and turns therein on an antifriction ball as shown. The drill spindle turns in the bushing 7 in the chuck end 8 of the casing. Keyed onto the upper end of said drill spindle is a spur gear 9, which receives motion mediately from the armature shaft, by means of either set of the gearing next described, according as a greater or less rapid movement is desired. Of such intermediate gears there are two sets, one composed of the spur gears 10 and 11, of which the gear 10 is adapted to intermesh with gear 5 on the armature shaft, and gear 11 to intermesh with gear 9 on the drill spindle; the other set is composed of gears 12 and 13, of which gear 12 is adapted to intermesh with gear 4 on the armature shaft, and gear 13 with gear 9 on the drill spindle.

Either set of said gears is thrown into mesh, according to the speed desired by turning the thumb wheel 48, which operates an eccentric, in the usual manner, the opposite set being at the same time automatically thrown out.

Coming now more specifically to the description of my new clutch and one approved method of applying the same to the drill as above described, reference will first be made to the set of gearing composed of spur gears 12 and 13, the application of the clutch to each set of intermediate gearing in practice being the same, though I have shown a different mode of application in Fig. 1 of the drawings for each set of intermediate gears for the purpose of convenient illustration. The spur gear 12 is loosely mounted on the pintle 14. On the under side of said spur gear is the positive member of my new clutch, composed of an annular boss 15, the face of which is undulating, the raised portions, or teeth, of such undulating surface being radially disposed. On the upper side of the gear 13 is a sleeve 16, large enough to leave a space between said sleeve and the pintle 14 for the receipt of the coil spring 17, which fits around said pintle. Keyed onto the sleeve 16, and adapted to slide vertically thereon, is the opposed, or negative member of my clutch, which, in the construction shown, is composed of the sleeve 18 and the top 19, the said top having an annular boss, corresponding to the boss 15, provided with an undulating surface the teeth of which are adapted to engage the teeth of the boss 15. The spring 17 is interposed between the top 19 and a screw plug 20, said plug being provided with a thumb nut 21 on its lower end, whereby the plug may be turned and the tension of the spring 17 suitably adjusted. The tension of said spring will normally keep the teeth of the clutch in engagement, and the said tension is such that the engagement will continue during the normal operation of the tool, and the power will thus be transmitted from the armature shaft, through the gears 12, 13 and 9 to the drill spindle 6. Should, however, an overload fall on the tool, the same will be communicated backwardly, through the gears 9 and 13 to the negative member of the clutch, where, the engagement of the members not being absolute, the increased, or abnormal, friction, will cause the clutch to expand against the tension of spring 17, the teeth sliding apart, and the positive member of the clutch will continue to slide over the negative member during the continuance of the overload, upon the removal thereof, however, the teeth will slide back into engagement and the tool will resume its normal operation. The arm 42 extends to the outside of the casing through a slot 45 and is provided with an operating handle 46. The other end of said arm has a finger 47 which is adapted to return the key to its original position where it will engage the gear 5 and properly connect up the transmission, as will be readily apparent, upon the operation of the handle 46.

To disconnect the motor from the dynamo or other source of power supply, the lower, or negative member of the clutch is provided with an annular collar 22; adapted to bear thereon is a roller 23, mounted in the end of a rod 24, which is slidably mounted in the wall of the casing 1. Pivotally connected with the free end of said rod is one end of a rock-bar 25, the rock-bar itself being pivotally mounted between posts on the casing. Pivotally connected with the other end of the rock-bar is a link 26, the free end of which link is pivotally connected with one end of a second rock-bar 27; the rock-bar 27 being pivotally mounted on the casing 1. The other end of the rock-bar 27 is pivotally connected with a second link 28, which link is also pivotally joined to the switch plate 29. Said switch-plate has a button 30 by means of which the same is operated.

In Figs. 1 and 2 of the drawings I have shown the parts in the positions assumed when the switch plate is in its "on" position, that is, when the current is completed and the motor is in operation. In said position, as will be seen by reference to Fig. 1, the roller 23 bears on the collar 22. When, now, the tool is subjected to an overload and the positive and negative members of the clutch are cause to expand, or separate, as above described, the collar 22 will force the rod 24 outwardly, and this will cause changes in the positions of the connected rock-bars and links, shown by broken lines in Fig. 2, the switch-plate being thus thrown, as similarly indicated, to its "off" position, thus breaking the current and relieving the motor of the overload and attendant injury. As soon as the overload is thus removed, the teeth of the clutch will return into engagement, and the roller 23 will be at a slight distance from the collar 22. On throwing the switch to its "on" position, the roller will again bear on the collar as shown.

In Fig. 4 of the drawings I have shown my new clutch in a slightly modified form as attached to a grinder. In such application, the positive member of the clutch 31 is screwed into a sleeve 32 for purposes of tension adjustment, and locked in proper position by a lock-screw 33. The tension spring 34 bears between the sleeve 32 and a collar 35 secured, by means of a pin 36 to the armature shaft. The positive member of the clutch is keyed to the armature shaft, but is longitudinally slidable thereon. The emery wheel 37 is suitably secured to a sleeve 38 rotatably mounted on the end of the armature shaft. The negative member of the clutch is on said sleeve 38. Slidably mounted in posts on the casing is a rod 39 which carries a roller 40 adapted to bear, when the current is "on", against a collar on the sleeve 32. When the clutch is caused to expand, as hereinabove explained, the positive member recedes against the tension of spring 34, forcing back the rod 39 and throwing the switch arm 41 to its "off" position, as shown by broken lines.

In the foregoing I have shown and described the application of my new clutch as adapted to disconnect the motor from the dynamo or other source of power. In the intermediate gearing composed of spur gears 10 and 11 of Fig. 1, however, I have shown a modified application in which, when the negative member of the clutch is thrown, as above set forth, by the stalling of the tool, the collar 22 will force downwardly the pivotally mounted arm 42, which carries with it a key 43, as shown in dotted lines in Fig. 8, thus releasing spur gear 5 which is loosely mounted on the armature shaft and permitting the said shaft to run free. The key 43 is slidably mounted in a collar 44 locked to the armature shaft.

The operation of my new clutch will be apparent from the foregoing description. The members of the clutch are normally in engagement, or, in other words, in fixed relative position with reference to each other, and expand, or other wise change such relative position, only when subjected to an overload. When expanded, the positive member of the clutch is permitted to turn independently of the negative member thereof, thus relieving the motor of the overload, and, as a further safeguard, the source of power supply may be disconnected from the motor, or the chain of transmission otherwise severed, by means of the change in the relative positions of the members of said clutch, thus discontinuing the operation of the machine until the overload is removed.

It will be understood that my new clutch is of wide adaptibility and susceptible of considerable modification in details, and I do not, therefore, limit myself to the applications and details shown, nor to the form of clutch whose members are expansible, as the said members may be caused otherwise to change their relative positions with the same results; and I desire to have it understood that the applications and details as shown are considered only as illustrative of the principles involved, the same being the change in the relative positions of the members of a clutch under an overload, and the control of the power thereby, either by the disconnection of the motor from the source of power supply or the severance of the transmission.

Having thus described my invention, what I claim as new and desire to secure by Letters Patent, is:

1. In a device of the character specified, a clutch comprising a driving and a driven member, means normally to hold said members in fixed relative position with reference to each other to transmit power, the engaging faces of said clutch members being adapted to cause said members to change such relative position under abnormal friction, an annular bearing surface on one of said clutch members, and means for controlling the power supplied to said driving member, said means being arranged to be operated by said bearing surface upon the change in the relative position of the members of said clutch.

2. In a device of the character specified, a clutch comprising a driving and a driven member, means normally to hold said members in fixed relative position with reference to each other under tension to transmit power, the engaging faces of said clutch members being adapted to cause said members to change such relative position under abnormal friction, means to adjust said tension, an annular bearing surface on one of said clutch members, and means for controlling the power supplied to said driving member, said means being arranged to be operated by said bearing surface upon the change in the relative position of the members of said clutch.

3. In a device of the character specified, a clutch comprising a driving and a driven member, said members being adapted to be placed in and out of engagement, a spring, said spring being adapted normally to hold said members in fixed relative position with reference to each other under tension to transmit power, the engaging faces of said clutch members being adapted to cause said members to change such relative position against the tension of said spring under abnormal friction, an annular bearing surface on one of said clutch members, and means for controlling the power supplied to said driving member, said means being arranged to be operated by said bearing surface upon the change in the relative position of the members of said clutch.

4. In a device of the character specified, a clutch comprising a driving and a driven member, said members being adapted to be placed in and out of engagement, a spring, said spring being adapted normally to hold said members in fixed relative position with reference to each other under tension to transmit power, the engaging faces of said clutch members being adapted to cause said members to change such relative position against the tension of said spring under abnormal friction, means to adjust the tension of said spring, an annular bearing surface on one of said clutch members, and means for controlling the power supplied to said driving member, said means being arranged to be operated by said bearing surface upon the change in the relative position of the members of said clutch.

FRANK J. BACKSCHEIDER.

Witnesses:
ARTHUR H. EWALD,
FREDK. J. WENDELU.